(12) United States Patent
Kwok

(10) Patent No.: US 7,815,148 B2
(45) Date of Patent: Oct. 19, 2010

(54) FUEL SYSTEM FOR AN AIRCRAFT INCLUDING A FUEL TANK INERTING SYSTEM

(75) Inventor: David W. Kwok, La Mirada, CA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 11/527,009

(22) Filed: Sep. 26, 2006

(65) Prior Publication Data

US 2008/0187785 A1 Aug. 7, 2008

(51) Int. Cl.
- B64D 37/00 (2006.01)
- B64D 37/32 (2006.01)
- B64D 41/00 (2006.01)
- H01M 8/04 (2006.01)

(52) U.S. Cl. .................... 244/135 R; 244/58

(58) Field of Classification Search ............ 244/135 R, 244/135 B, 58; 220/4.12, 4.13, 4.14, 4.15, 220/88.3; 206/0.6
See application file for complete search history.

(56) References Cited

U.S. PATENT DOCUMENTS

| | | | |
|---|---|---|---|
| 6,296,957 B1 | 10/2001 | Graage | |
| 6,450,447 B1* | 9/2002 | Konrad et al. | 244/53 R |
| 2003/0224231 A1* | 12/2003 | Penev | 429/26 |
| 2004/0043276 A1* | 3/2004 | Hoffjann et al. | 429/26 |
| 2004/0124308 A1* | 7/2004 | Daggett | 244/58 |
| 2005/0136302 A1* | 6/2005 | Shoji et al. | 429/26 |
| 2007/0111060 A1 | 5/2007 | Hoffjann et al. | |
| 2008/0001026 A1* | 1/2008 | Hoffjann et al. | 244/58 |
| 2008/0070078 A1* | 3/2008 | Gummalla et al. | 429/26 |

FOREIGN PATENT DOCUMENTS

| | | |
|---|---|---|
| EP | 1902954 A2 | 3/2008 |
| JP | 2001338660 A | 12/2001 |

OTHER PUBLICATIONS

Machine translation of JP2001338660A.*
Human translation of JP-13338660 to Hayashi et al. "Fuel Supply Part Explosion Prevention Device".*
Wikipedia article "Direct-methanol fuel cell" dated Oct. 1, 2005 and accessed Jan. 27, 2009 at http://web.archive.org/web/20051001111741/http://en.wikipedia.org/wiki/Direct-methanol_fuel_cell/.*

* cited by examiner

Primary Examiner—Tien Dinh
Assistant Examiner—Richard R Green
(74) Attorney, Agent, or Firm—Sawyer Law Group, P.C.

(57) ABSTRACT

A fuel system for an aircraft is disclosed. The fuel system comprises a fuel tank and a fuel reformer for receiving fuel from the fuel tank. The system includes a hydrogen fuel cell array for receiving hydrogen from the fuel reformer. The system further includes mechanism for providing an inerting gas from the fuel system to the fuel tank.

6 Claims, 6 Drawing Sheets

US 7,815,148 B2

FUEL SYSTEM FOR AN AIRCRAFT INCLUDING A FUEL TANK INERTING SYSTEM

FIELD OF THE INVENTION

The present embodiment relates generally to aircraft and more particularly to a fuel tank inerting system for use with the aircraft.

BACKGROUND OF THE INVENTION

Recent Federal Aviation regulations require that new transport aircraft include systems that provide for safe fuel tank operation. A flammable fuel mixture may occur as a function of the ullage portion of the fuel tank and environmental factors such as temperature and altitude.

Three conditions are needed for ignition: a fuel, an oxidizer, and an ignition source. In a fuel tank, fuel is always present, ignition source and oxidizer may also be present. The Federal Aviation Administration (FAA) is working to eliminate ignition source in commercial aircraft fuel tanks. The military is well aware that when aircraft are operating in battlefield environments, eliminating ignition source is impossible. Both FAA and the military recognize reducing oxidizer in fuel tanks to below ignition limit is the best way to avoid fuel tank ignition.

There were seventeen fuel tank ignition incidents since 1959. Three occurred since 1990 resulting in 239 fatalities. It had been typically assumed by the FAA that the cause for these incidents is flammable fuel vapors in ullage portion of fuel tank during flight. New Federal regulations require that fuel tank installation must include either a means to minimize the development of flammable vapors in fuel tanks or a means to mitigate the effects of an ignition of fuel vapors within fuel tanks. This requirement applies to all transport category aircraft.

During the Vietnam War, thousands of aircraft were lost due to enemy ground fire, from small arms fires to anti-aircraft artillery and surface-to-air missiles. Analysis indicated that fuel tank fire and explosion was the major cause of aircraft due to ballistic impacts. Fuel tanks on military aircraft must also be protected.

There are conventional systems that attempt to protect the fuel tank by minimizing the development of flammable vapors in the fuel tank. For example a flammability reduction system such as fuel tank inerting system is utilized. In another example an ignition mitigating device such as foam is utilized to eliminate fuel tank ignition probability. To describe these conventional systems in more detail, refer now to the following discussion.

1. On-board inert gas generation system (OBIGGS)—OBIGGS may be used to generate oxygen-depleted gas to inert the ullage space in fuel tanks. Inerting the ullage portion of the fuel tank reduces the oxidizer in the fuel tank and therefore reduces the flammability of the vapor therewithin.

2. Passive inert system—bottled gas, such as nitrogen or carbon dioxide, or carbon dioxide gas from dry ice, may be used for fuel tank inerting.

3. Polyurethane foam—foam may be installed in fuel tanks. It prevents an explosion by removing energy from the combustion process through absorption of heat and mechanical interference.

All of the above-identified systems have problems associated therewith. The following will describe some of the problems associated therewith.

Firstly, OBIGGS is a complex machine. It separates oxygen and nitrogen, the two main components of air. The oxygen is not used and nitrogen is pumped into fuel tanks to reduce the oxygen concentration in the ullage portion above the fuel in fuel tanks. When the ullage portion gas fuel/oxygen ratio is below the ignition limit, no spontaneous combustion will take place. In addition, OBIGGS is an expensive addition to an aircraft. For example in the Apr. 24, 2006 issue of Aviation Week & Space Technology it was reported that "about 3,814 transports in the U.S. fleet alone would be affected at $140-220 million per aircraft over a seven year period, according to the FAA" by using the OBIGGS system Secondly, a passive system such as a bottled gas and dry ice would add significant logistics requirements to the aircraft. In addition the passive system would also require special personnel to handle the bottled gas and dry ice.

In some aircraft, foam may be used to deter ignition in fuel tanks. However the foam is heavy; does not allow total use of available fuel in the tank; and deteriorates over time. In addition replacing the foam in the fuel tank is messy and dangerous.

What is needed, therefore, is a system and method to overcome these issues. The present embodiment addresses such a need.

SUMMARY OF THE INVENTION

A fuel system for a hydrogen-powered aircraft is disclosed. The fuel system comprises a fuel tank and a fuel reformer for receiving fuel from the fuel tank. The system includes a hydrogen fuel cell array for receiving hydrogen from the fuel reformer. The system further includes a mechanism for providing an inerting gas from the fuel system to the fuel tank.

DETAILED DESCRIPTION

The present embodiment relates generally to aircraft and more particularly to a fuel tank inerting system for use with the aircraft. The following description is presented to enable one of ordinary skill in the art to make and use the embodiment and is provided in the context of a patent application and its requirements. Various modifications to the embodiments and the generic principles and features described herein will be readily apparent to those skilled in the art. Thus, the present embodiment is not intended to be limited to the embodiments shown, but is to be accorded the widest scope consistent with the principles and features described herein.

Figure 1:
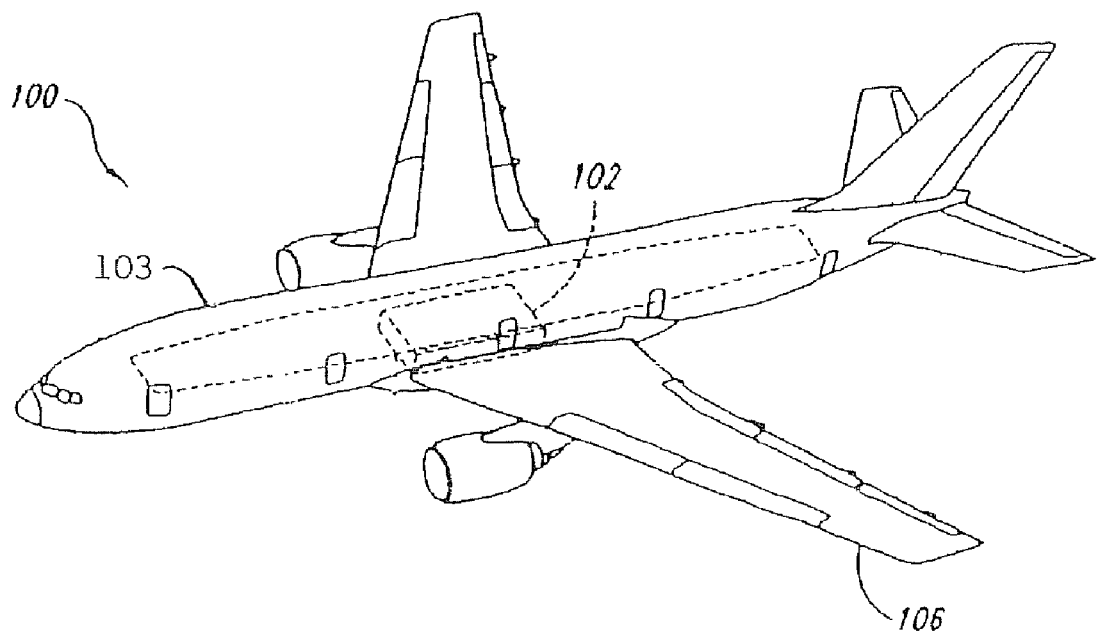
FIG. 1 is a partially schematic isometric view of an aircraft having a fuel tank 102.

FIG. 1 is a partially schematic isometric view of an aircraft having a fuel tank 102 within a housing 103 of the aircraft 102. In one aspect of this embodiment, the fuel tank 102 may be a center-wing tank positioned at least partially in a fuselage 104 of the aircraft 100 adjacent to a wing 106. In other embodiments, one or more other fuel tanks may be in the aircraft 100, such as additional fuel tanks positioned in the wing 106 and/or the fuselage 104 and/or the tail.

The optimum method for preventing ullage gas ignition is to dilute the oxygen gas concentration with an inert gas in the fuel tank to below the ignition limit. Historically, engine exhaust, carbon dioxide, nitrogen, and Halon had been used for fuel tank inerting.

Figure 2:
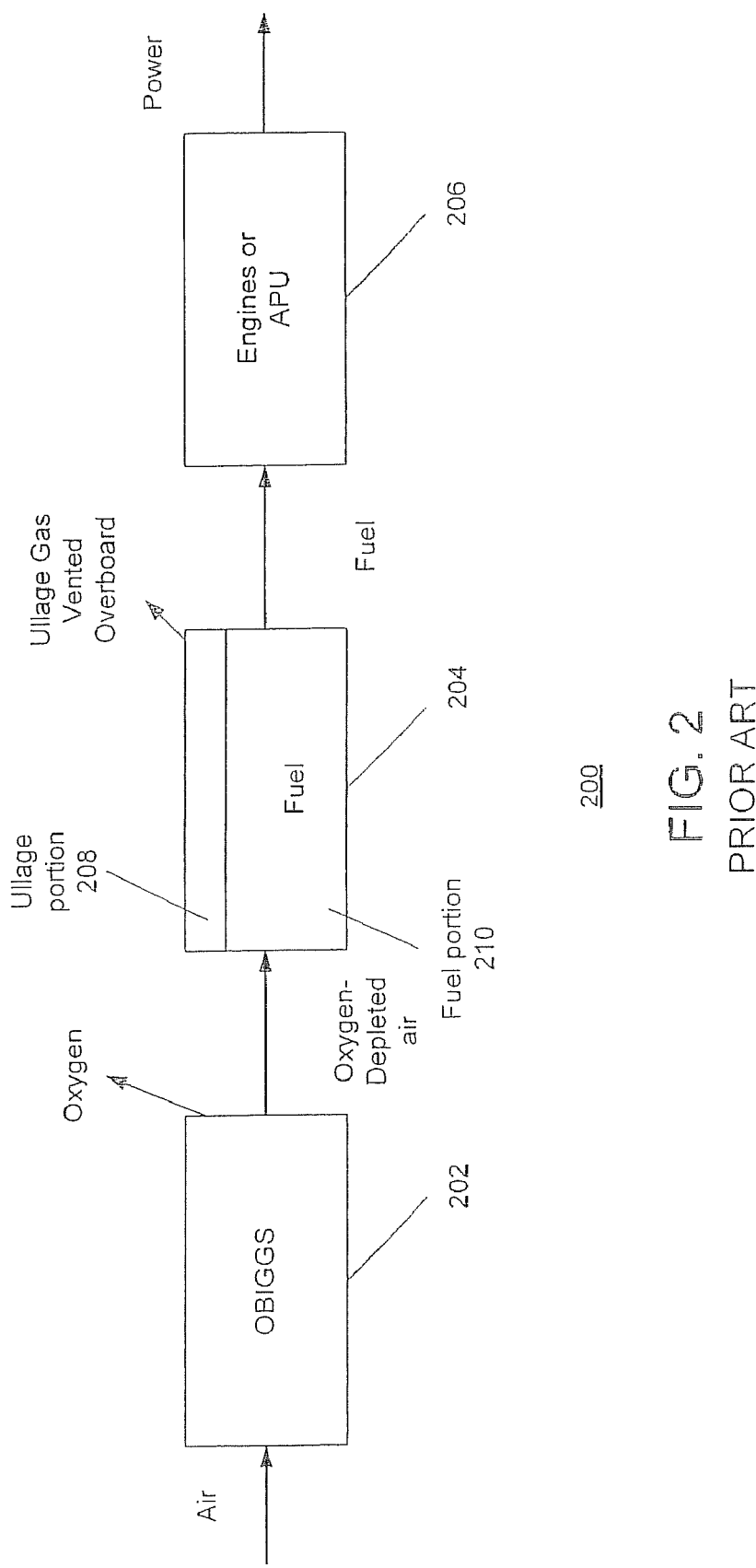
FIG. 2 is a block diagram of a conventional On-Board Inert Gas Generation System (OBIGGS).

FIG. 2 shows a schematic of a conventional On-Board Inert Gas Generation system (OBIGGS) 200. Referring to FIG. 2, air may be delivered to the OBIGGS 202. The OBIGGS 202 may be coupled to the fuel tank 204. Oxygen may then be released from the OBIGGS 202, and the oxygen-depleted air may be sent to the fuel tank 204. Ullage gas may then be vented overboard from the ullage of fuel tank 204. Fuel may then be delivered to the engines or to the auxiliary power unit (APU) 206, thereby generating power.

Conventionally, to reduce the logistic requirement at the airports, OBIGGS is preferred. Since carbon dioxide is a green house gas (no one wants to generate carbon dioxide unnecessarily) and air is 79% nitrogen, nitrogen-generating OBIGGS are used on aircraft today.

However as before mentioned, OBIGGS is a complex machine. It separates oxygen and nitrogen, the two main components of air. The oxygen is not used and nitrogen is pumped into fuel tanks to reduce the oxygen concentration in the ullage portion above the fuel in fuel tanks. When the ullage portion gas fuel/oxygen ratio is below the ignition limit, no spontaneous combustion will take place. In addition, OBIGGS is an expensive addition to an aircraft.

To make aircraft more efficient and environment friendly, new aircraft designs are moving toward more-electric or all-electric airplane concept. A concept for power generation is to replace the APU with hydrogen fuel cells. An APU is a turbo-machine designed to generate power while the aircraft is on the ground without any of its engines running. It may be inefficient and generates much of the air and noise pollution near airports. In flight, the more efficient engines are used for power generation. Fuel cells are much more efficient and less polluting than APUs and engines. When fuel cells are used in place of APUs for power generation, they may be used continuously eliminating the need for costly power offtake.

Figure 3:
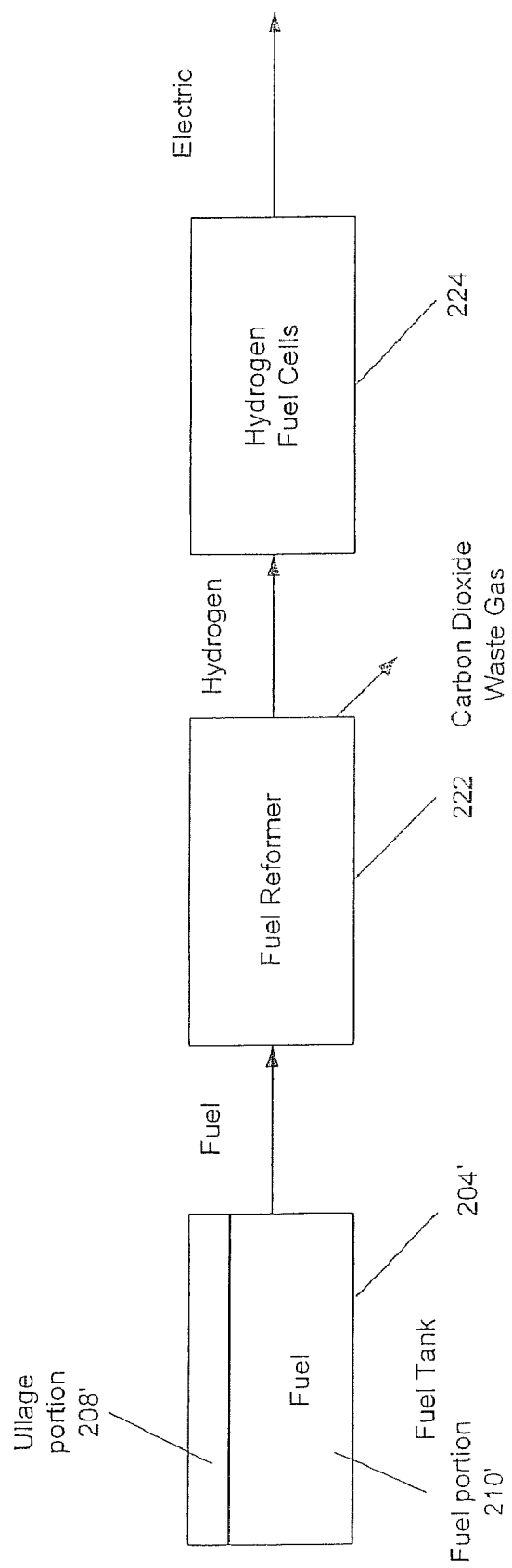
FIG. 3 is a block diagram of a conventional hydrogen fuel cell system.

FIG. 3 shows a schematic of a conventional hydrogen fuel cell system 300. The fuel tank 204' is coupled to the fuel reformer 222. Fuel may then be sent from the fuel tank 204' to the fuel reformer 222. The hydrogen fuel reformer 222 produces carbon dioxide as a byproduct. Carbon dioxide waste gas may then be released from the fuel reformer 222. The fuel reformer 222 is coupled to the hydrogen fuel cells 224, and hydrogen may be provided from the fuel reformer 222 to the hydrogen fuel cells 224. The hydrogen fuel cells 224 may then generate electric power for various components of a vehicle, for example, in an aircraft the fuel cells could generate power to provide lighting on the aircraft, to provide communication on the aircraft and to provide entertainment services on the aircraft (audio and video).

Fuel cells run on hydrogen; aircraft run on jet fuel. Designing an aircraft to use duel fuel is impractical. The solution to the hydrogen fuel requirement is a fuel reformer. A fuel reformer breaks the hydrocarbon fuel into hydrogen and carbon dioxide gases. Hydrogen may be used in the fuel cells to generate electricity and the carbon dioxide, a by-product, is exhausted overboard.

As described earlier, a hydrogen fuel reformer produces carbon dioxide as a byproduct. The carbon dioxide gas may be used to inert the fuel tanks. This system recycles a waste product for fuel tank and produces no net gain in green house gas. When implemented, this system replaces the expensive OBIGGS.

Carbon dioxide is an example of an inert gas. A system and method in accordance with the below described embodiments uses a waste gas such as carbon dioxide from the fuel reformer, to inert the fuel tank.

In a method and system in accordance with the embodiments fuel may be delivered from the fuel tank to the fuel reformer. In an embodiment, two gases are produced. Hydrogen may be sent to the fuel cells for power generation. The carbon dioxide waste gas may be routed back to the fuel tank to inert the ullage space above the fuel in the fuel tank before being vented overboard through the standard fuel tank venting system. In one embodiment a conditioning system may be required to remove impurities from the waste gas. These impurities may include carbon monoxide, moisture, and other chemicals that may be found in jet fuel around the world. The conditioning system may include filters and/or catalytic converters.

Accordingly, instead of discarding the carbon dioxide waste gas overboard, the gas may be used once more for fuel tank inerting. This process eliminates the need for an OBIGGS. To describe the features of the embodiments in more detail refer now to the following discussion in conjunction with the accompanying Figures.

Figure 4A:
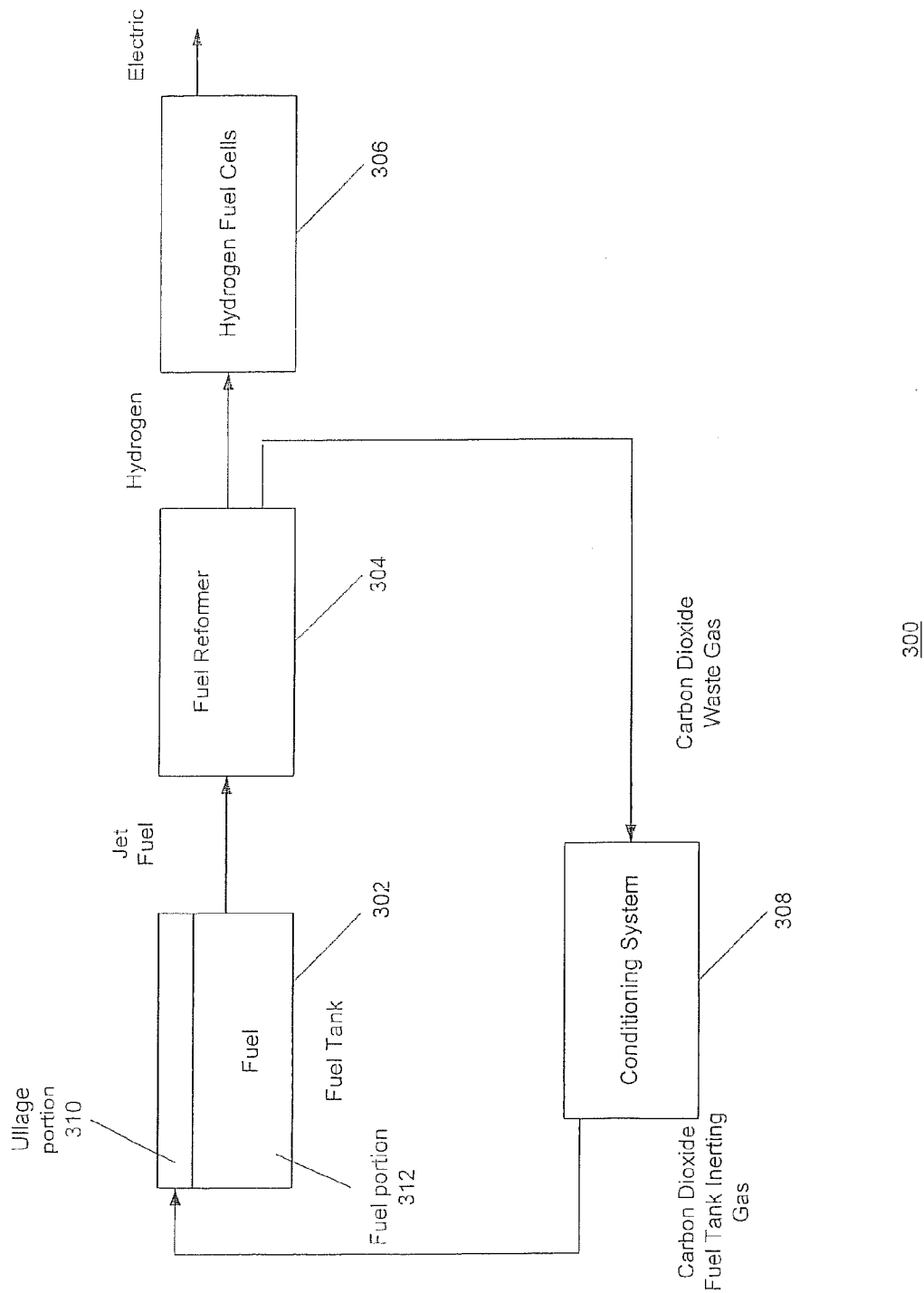
FIG. 4A is a block diagram of a first embodiment of a fuel system for an aircraft including a fuel inerting system.

FIG. 4A is a block diagram of a first embodiment of a fuel system for an aircraft including a fuel inerting system. As is seen, the fuel tank 302 may be coupled to the fuel reformer 304. The fuel tank 302 may include a fuel portion 312 and an ullage portion 310. Jet fuel may be transported from the fuel tank 302 to the fuel reformer 304. The fuel reformer may be coupled to hydrogen fuel cells 306. Hydrogen may be sent from the fuel reformer 304 to the hydrogen fuel cells 306. The hydrogen fuel cells 306 may then generate electric power for various components of a vehicle (e.g. aircraft).

Returning to the fuel reformer 304, the fuel reformer 304 may be also coupled to the conditioning system 308. An inerting waste gas may be provided from the fuel reformer 304 to the conditioning system 308. The conditioning system 308 may remove impurities in the waste gas to preserve the inerting properties. It should be understood that if the inerting gas (carbon dioxide) is pure, a conditioning system is not necessary and the gas may be provided directly from the fuel reformer to the fuel tank via a feedback line.

The conditioning system 308 may be coupled to the ullage portion 310 of the fuel tank 302, and inerting gas may be provided from the conditioning system 308 to ullage portion 310 of the fuel tank 302 to inert the fuel tank to minimize flammability.

Figure 4B:
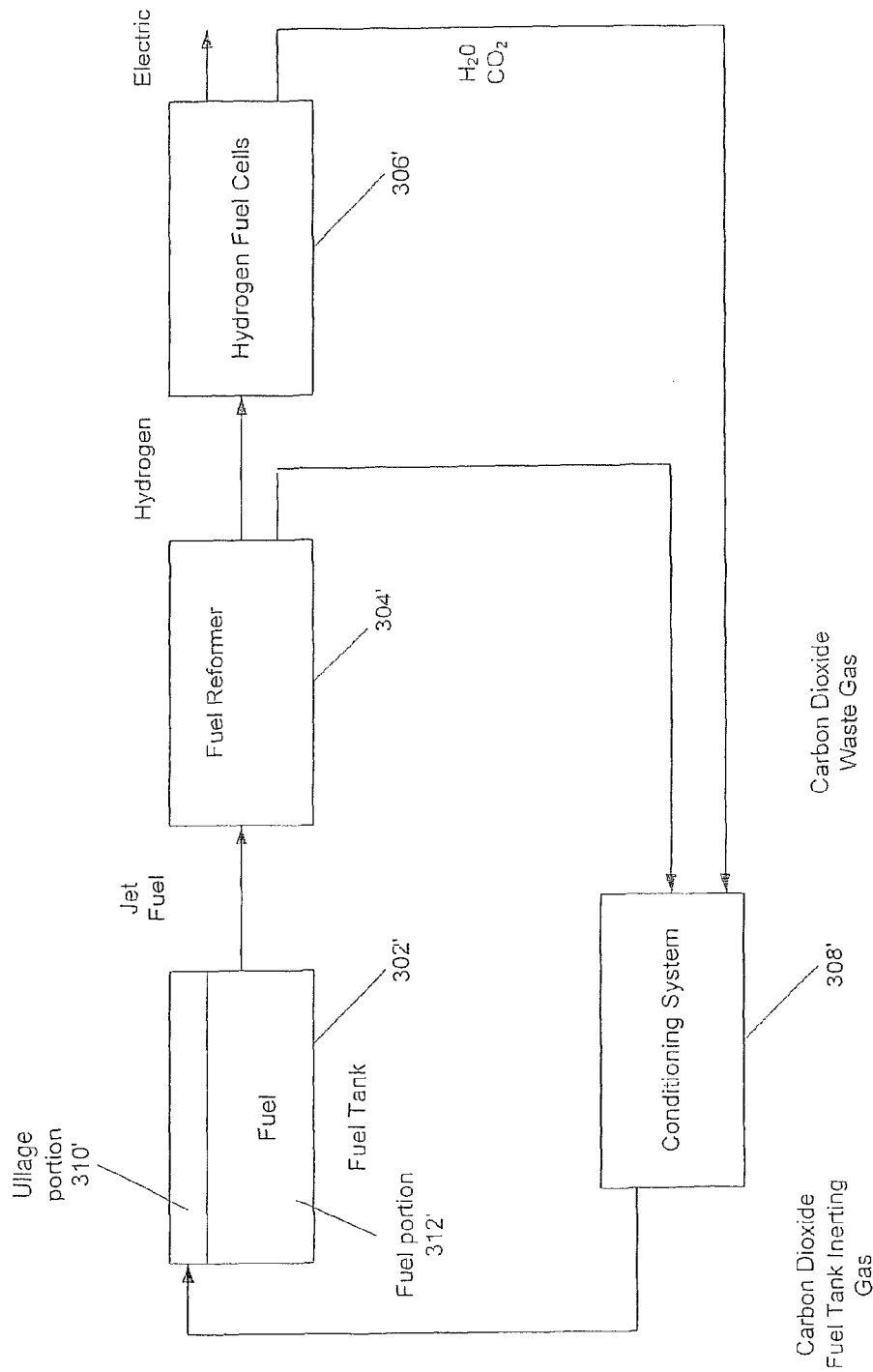
FIG. 4B is a block diagram of a second embodiment of a fuel system for an aircraft including a fuel inerting system.

FIG. 4B is a block diagram of a second embodiment of a fuel system for an aircraft including a fuel inerting system. In this second embodiment, the fuel tank 302' may be coupled to the fuel reformer 304'. Jet fuel may be transported from the fuel tank 302' to the fuel reformer 304'. The fuel tank 302' may include a fuel portion 312' and an ullage portion 310'. The fuel reformer 304' may be coupled to the hydrogen fuel cells 306'. The hydrogen fuel cells may then produce electric power for various components of a vehicle (e.g. aircraft). The hydrogen fuel cells 306' may also be coupled to a conditioning system 308', and inerting waste gas may be provided from the hydrogen fuel cells 306' to the conditioning system 308'.

The conditioning system 308' may provide the inerting gas to the ullage portion 310' of the fuel tank 302' to minimize flammability within the fuel tank. The conditioning system 308' may have several elements including a water separator to remove water as one of the impurities. It should be understood that if the inerting gas (carbon dioxide) is pure, a conditioning system is not necessary and the gas can be provided directly from the hydrogen fuel cells to the fuel tank via a feedback line.

Figure 4C:
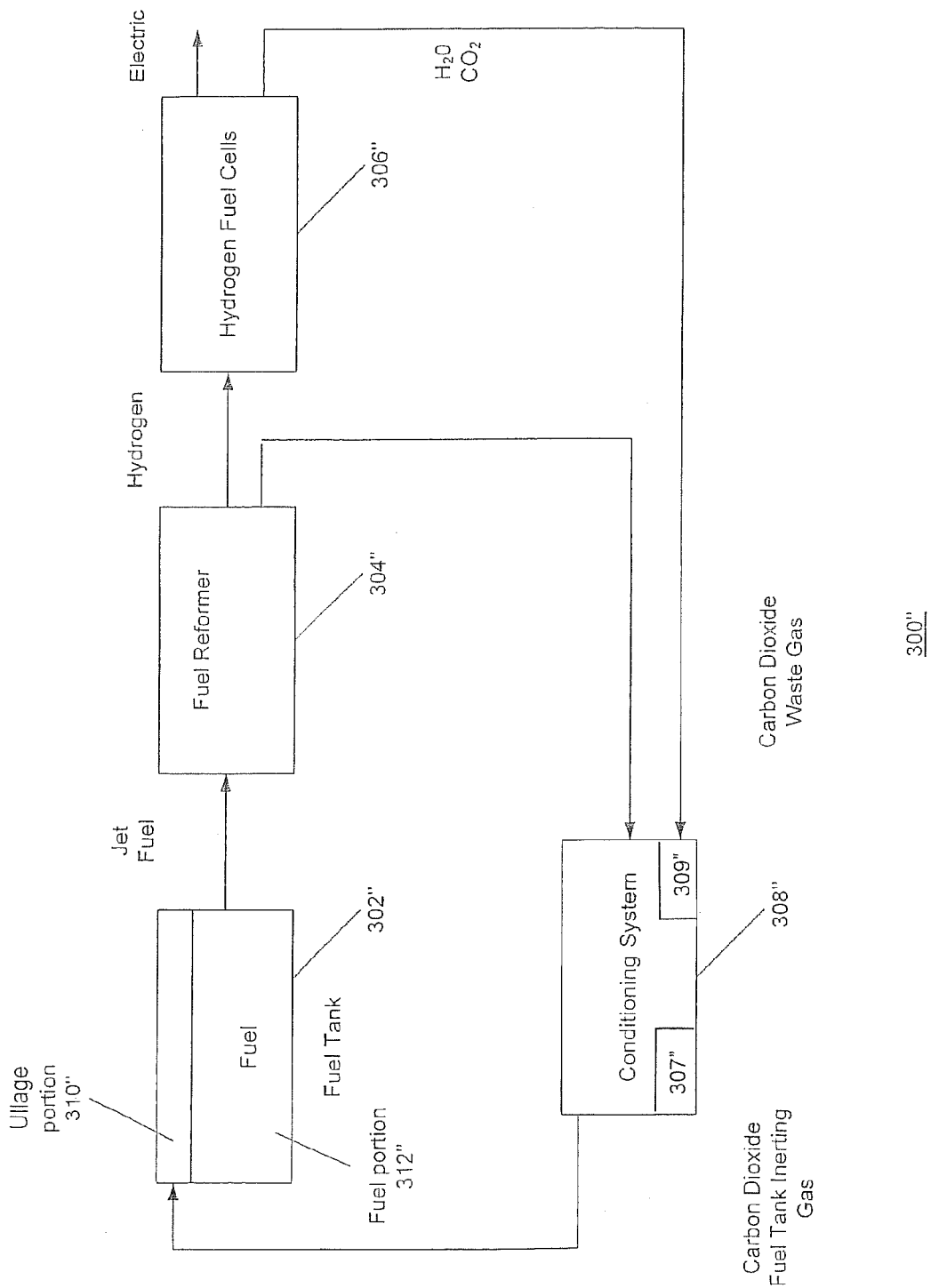
FIG. 4C is a block diagram of a third embodiment of a fuel system for an aircraft including a fuel inerting system.

FIG. 4C is a block diagram of a third embodiment of a fuel system for an aircraft including a fuel inerting system. Fuel tank 302" may be coupled to fuel reformer 304". The fuel tank 302" may include a fuel portion 312" and an ullage portion 310". Jet fuel may be transported from the fuel tank 302" to the fuel reformer 304".

Fuel reformer 304" may be coupled to the hydrogen fuel cells 306". The hydrogen fuel cells 306" may then generate electric power for various components of a vehicle (e.g. aircraft). The fuel reformer 304" may provide inerting waste gas to the conditioning system 308". The inerting waste gas may also be provided from the hydrogen fuel cells 306" to the conditioning system 308". The conditioning system 308" may be coupled to the fuel tank 302", and the inerting gas may be provided from the conditioning system 308" to the fuel tank 302". The conditioning system 308' may have several elements including a water separator to remove water as one of the impurities. It should be understood that if the inerting gas (carbon dioxide) is pure, a conditioning system is not necessary and the gas can be provided directly from the fuel reformer 304" and the fuel cells 306" to the ullage portion 310" of the fuel tank 302" via a feedback line.

CONCLUSION

In a method and system in accordance with the present embodiment, fuel may be delivered from the fuel tank to the fuel reformer. In an embodiment, two gases are produced. Hydrogen may be sent to the fuel cells for power generation. The carbon dioxide waste gas may be routed back to the fuel tank to inert the ullage space above the fuel in the fuel tank before being vented overboard through the standard fuel tank venting system. A carbon dioxide conditioning system may be required to remove impurities from the waste gas. These impurities may include carbon monoxide, moisture, and other chemicals that may be found in jet fuel around the world. The conditioning system may include filters 307" and/or catalytic converters 309". Instead of discarding the carbon dioxide waste gas from the fuel reformer overboard, the gas may be used once more for fuel tank inerting.

Advantages

As mentioned earlier, the process in accordance with the present embodiment may eliminate the need for an On-Board Inert Gas Generation System (OBIGGS).

OBIGGS uses compressed bleed air from the engines. When in use, engine performance is reduced, therefore, OBIGGS usage is expensive. In the case where carbon dioxide waste gas does not provide adequate fuel-tank-inerting protection, a hybrid system may be provided. Waste gas may then be utilized to augment OBIGGS-generated inert gas for fuel tank inerting. This approach may both reduce the cost of a larger OBIGGS and engine performance degradation.

This process also may eliminate the need for a separate inert gas generation system or inert gas storage system when a fuel cell is used for electricity generation.

Although the present embodiment has been described in accordance with the embodiments shown, one of ordinary skill in the art will readily recognize that there could be variations to the embodiments and those variations would be within the spirit and scope of the present embodiment. For example, implementations of a cabin services system described above can be implemented in any type of vehicles including, e.g., helicopters, passenger ships, automobiles, and so on. Accordingly, many modifications may be made by one of ordinary skill in the art without departing from the spirit and scope of the appended claims.

What is claimed is:

1. A fuel system comprising:
    a fuel tank comprising a fuel portion and an ullage portion coupled to the fuel portion;
    a fuel reformer for receiving fuel from the fuel tank and for providing hydrogen and carbon dioxide;
    a plurality of fuel cells for receiving the hydrogen from the fuel reformer and for providing electricity; and
    a conditioning system that utilizes a plurality of filters and catalytic converters to remove water and impurities from the carbon dioxide provided only by the fuel reformer, without the use of an On-Board Inert Gas Generation System (OBIGGS) wherein the conditioning system is coupled only to the fuel reformer and the ullage portion of the fuel tank.

2. The fuel system of claim 1 wherein the conditioning system provides—the carbon dioxide as—an inerting gas to the ullage portion.

3. The fuel system of claim 1 wherein the fuel cells provide power to components in a vehicle.

4. An airplane comprising:
    a housing; and
    a fuel system within the housing: the fuel system comprising:
    a fuel tank comprising a fuel portion and an ullage portion coupled to the fuel portion;
    a fuel reformer for receiving fuel from the fuel tank and for providing hydrogen and carbon dioxide;
    a plurality of fuel cells for receiving the hydrogen from the fuel reformer and for providing electricity, the plurality of fuel cells producing waste gas; and
    a conditioning system that utilizes a plurality of filters and catalytic converters to remove water and impurities from the carbon dioxide provided only by the fuel reformer, without the use of an On-Board Inert Gas Generation System (OBIGGS) wherein the conditioning system is coupled only to the fuel reformer and the ullage portion of the fuel.

5. The airplane of claim 4 wherein the conditioning system provides—the carbon dioxide as—an inerting gas to the ullage portion.

6. A fuel system comprising:
    a fuel tank comprising a fuel portion and an ullage portion coupled to the fuel portion; wherein the fuel tank comprises a fuel portion and a ullage portion coupled to the fuel portion;
    a fuel reformer for receiving fuel from the fuel tank and for providing hydrogen and carbon dioxide;
    a plurality of fuel cells for receiving the hydrogen from the fuel reformer and for providing electricity, the plurality of fuel cells producing waste gas; and
    a conditioning system that utilizes a plurality of filters and catalytic converters to remove water and impurities from the carbon dioxide, provided only by the fuel reformer without the use of an On-Board Inert Gas Generation System (OBIGGS) wherein the conditioning system is coupled only to the fuel reformer and the ullage portion of the fuel tank.

* * * * *